United States Patent [19]
Deutsch

[11] Patent Number: 4,996,870
[45] Date of Patent: Mar. 5, 1991

[54] APPARATUS AND METHOD FOR PROVING GAS METERS AND IMPROVED SENSOR THEREFOR

[75] Inventor: Harry F. Deutsch, New Hope, Pa.

[73] Assignee: Measurement Systems, Inc., New Hope, Pa.

[21] Appl. No.: 489,960

[22] Filed: Mar. 6, 1990

Related U.S. Application Data

[63] Continuation of Ser. No. 339,291, Apr. 17, 1989, abandoned.

[51] Int. Cl.$^5$ ............................................. G01F 25/00
[52] U.S. Cl. .......................................................... 73/3
[58] Field of Search ...................... 73/3, 262; 324/202, 324/208, 226, 227; 364/571.01; 335/2, 91, 92

[56] References Cited

U.S. PATENT DOCUMENTS

| | | |
|---|---|---|
| 3,253,099 | 5/1966 | Hess . |
| 3,397,347 | 8/1968 | Hoeppel . |
| 3,937,048 | 2/1976 | St. Clair et al. . |
| 4,027,523 | 6/1977 | St. Clair . |
| 4,286,854 | 9/1981 | Seckendorf . |
| 4,301,440 | 11/1981 | Kubota et al. . |
| 4,315,523 | 2/1982 | Mahawili et al. . |
| 4,820,888 | 4/1989 | Shields . |

FOREIGN PATENT DOCUMENTS

| | | |
|---|---|---|
| 506765 | 12/1976 | U.S.S.R. |
| 609972 | 6/1978 | U.S.S.R. |
| 1048326 | 10/1983 | U.S.S.R. |

OTHER PUBLICATIONS

Selecting Magnets For Reed Switch Actuation, by Lester R. Moskowitz, Franklin Institute Research Laboratories, Phila., PA.

*Primary Examiner*—Robert Raevis
*Attorney, Agent, or Firm*—Ferrill and Logan

[57] ABSTRACT

Apparatus and method for proving a test meter comprising a standard for a test gas to a meter; encoder means for determining the amount of test gas supplied from said standard; valve for regulating the flow of gas from said supply means; a sensor comprising two metallic reeds encapsulated in a housing, said reeds being maintained in a non-contacting position the magnetic field of at least two magnets, said sensor being placed in proximity to the oscillating diaphragm of a gas meter whereby said oscillating diaphragm periodically interferes with said magnetic field thereby resulting in the periodic contact of said reeds and the generation of a signal at said sensor representing the passage of a predetermined quantity of test gas; and an electronic sensing device which activates upon the contact of the metallic reeds. The mechanism includes a device for adjusting the sensitivity of the reeds.

15 Claims, 6 Drawing Sheets

| | | | | | | | | | | TOTAL |
|---|---|---|---|---|---|---|---|---|---|---|
| TEST VALVE | (11) | | ///// | ///// | | | ///// | | | |
| OPEN VALVE | (6) | ///// | | ///// | ///// | | | | | |
| CHECK VALVE | (7) | | | | | | ///// | | | |
| EXERCISE VALVE | (8) | ///// | | | | | | | | |
| SECONDS | (46) | 10.0 | 10.0 | 2.0 | 6.0 | 1.0 | 6.7 | 20 | 1.0 | 56.7 |
| SECONDS | (47) | 10.0 | 10.0 | 2.0 | 10.0 | 1.0 | 6.7 | 33.3 | 1.0 | 74.0 |
| TEST SEGMENT | | 38 | 39 | 40 | 41 | 42 | 43 | 44 | 45 | |

FIG. 5

Fig. 6

APPARATUS AND METHOD FOR PROVING GAS METERS AND IMPROVED SENSOR THEREFOR

RELATED APPLICATION

This application is a continuation of U.S. Ser. No. 339,291, filed Apr. 17, 1989, now abandoned.

FIELD OF THE INVENTION

The present invention is directed to a device and method for testing or proving gas metering devices. Specifically, the present invention is directed to devices and methods for testing or proving diaphragm type gas metering devices, and most particularly, to a magnetic sensing mechanism and method to be utilized in diaphragm meter testing or proving.

BACKGROUND OF THE INVENTION

The present invention is directed to an improved method and device to be used in testing the accuracy of positive displacement diaphragm type gas meters and in particular, natural gas meters. A key aspect of the present invention is the provision of a magnetic sensor for accurately metering gas flow through a diaphragm gas metering device.

In order to test or prove a positive displacement diaphragm meter, a test gas, normally air, is passed from an accepted standard (Bell Prover, Sonic Nozzle, Master Meter, etc.) through the test meter. The volume of air passed by the standard is compared to the volume registered by the test meter (as read on the meter index). This relationship is known as the "meter accuracy" or its reciprocal, the "meter proof".

There are two primary prior art methods of getting the start and end points of a meter accuracy test. In the first or conventional proving method, a photo-electric device is used to determine when a preset number of revolutions of the meter index proving dial have occurred. When the proving dial pointer first breaks the photo-electric light beam, the volume of the standard is noted as the initial volume. The final volume is noted after the beam has been broken the preset number of times. The start volume is subtracted from the end volume and then compared to the volume indicated by the test meter index, thereby providing the accuracy of the test meter.

The second method is grounded in the phenomenon that individual diaphragm meters have their own unique pressure "signatures" (See, e.g. U.S. Pat. No. 3,937,048). Simply stated, diaphragm meters have one or more pressure peaks and troughs during each cycle of the diaphragm, and these peaks and troughs tend to periodically repeat themselves. The pressure signature method chooses one of the pressure peaks and attempts to detect this peak during subsequent cycles (known in the industry as "tangent revolutions"). In a typical test, the pressure peak which is chosen starts the test, and the test continues for a preset number of pressure peaks. The accuracy is calculated as in the first method.

There are several problems associated with the prior art methods of gas meter testing. First, both prior art methods are more time consuming. The photo-electric method normally passes two cubic feet of test gas through the meter under test, and requires approximately 4 minutes to complete a test. The pressure signature method, while passing a fraction of a cubic foot of gas, requires approximately 85 seconds to perform the same test.

The pressure signature method has the additional problem of requiring the repetitive identification of one of the many peaks which occur within each tangent revolution. This is sometimes problematic because the amplitude of the peaks can vary between tangent revolutions, thereby leading to improper readings.

Moreover, in the pressure signature method, if an incorrect peak is sensed, there is no provision for warning the user. Further, because the pressure signature method relies upon the identification of a specific peak, several tangent revolutions may have to be performed in order to identify an appropriate starting point.

Finally, the pressure signature method requires expensive equipment including an extremely sensitive pressure transducer, a hybrid circuit board (to condition the pressure signal into a single triggering pulse, for each tangent revolution) and a DC power supply.

It would be desirable to have a gas meter test device and method which eliminates the problems associated with the conventional and pressure signature methods.

It would be particularly desirable to have a novel magnetic sensor which can be utilized in conjunction with the testing or proving of diaphragm meters and which can be placed in proximity to the opaque metallic housing of a gas meter to be tested.

It is therefore an object of the present invention to provide a gas meter tester which can quickly prove or test a positive displacement diaphragm meter on fewer tangent cycles of the meter. The present invention can prove a meter on three tangent revolutions with a commensurate time savings over the pressure signature proving method and the conventional proving method.

It is a further object of the present invention to provide a proving or testing device which is triggered by the movement of the diaphragm connecting arm itself, and therefore does not require the repetitive identification of a single pressure peak.

It is a further object of the present invention to provide a test device and method which is compatible for use with a computer for storing signals corresponding to the volume of gases passed between cycles.

It is still a further object of the present invention to provide a magnetic sensor for a gas meter proof testing device, which can be placed outside the opaque housing of a test meter and which can magnetically monitor the direct movement of the diaphragm arm.

It is yet a further object of the present invention to provide a test device and method which can be performed utilizing inexpensive equipment including a magnetic position sensor, a PC compatible parallel port, a D/A Converter and a voltage source supplied by the computer.

SUMMARY OF THE INVENTION

In accordance with the present invention, a method for testing the accuracy of a diaphragm gas meter comprising the following steps: placing an external magnetic sensor in proximity to the oscillating diaphragm of a gas meter under test, each of said diaphragm oscillations corresponding to the passage through said gas meter of a quantity of test gas, said periodic oscillation of the diaphragm resulting in the activation of said sensor; sensing an electrical signal generated by the activation of said sensor, said signal corresponding to an amount of test gas passing through said meter; measuring the amount of test gas passing through said meter using a standard; and comparing the amount of gas measured by the standard with the amount of gas sensed upon the activation of the sensor in order to determine the accuracy of said meter.

In accordance with the present invention an improved sensor for testing diaphragm type gas meter test apparatus is disclosed along with the method of proving meter accuracy.

A particular feature of the present invention is the inclusion of the novel sensor. The sensor utilizes at least two coplanar metallic reeds encapsulated in a housing, the reeds being maintained in a non-contacting position by a magnetic field. The sensor is placed in proximity to the oscillating diaphragm of a gas meter whereby said oscillating diaphragm periodically interferes with said magnetic field thereby leading to the contact of said reeds and the generation of a signal. The signal is sensed and stored in a processor device.

DETAILED DESCRIPTION OF THE PREFERRED EMBODIMENT

Figure 1:
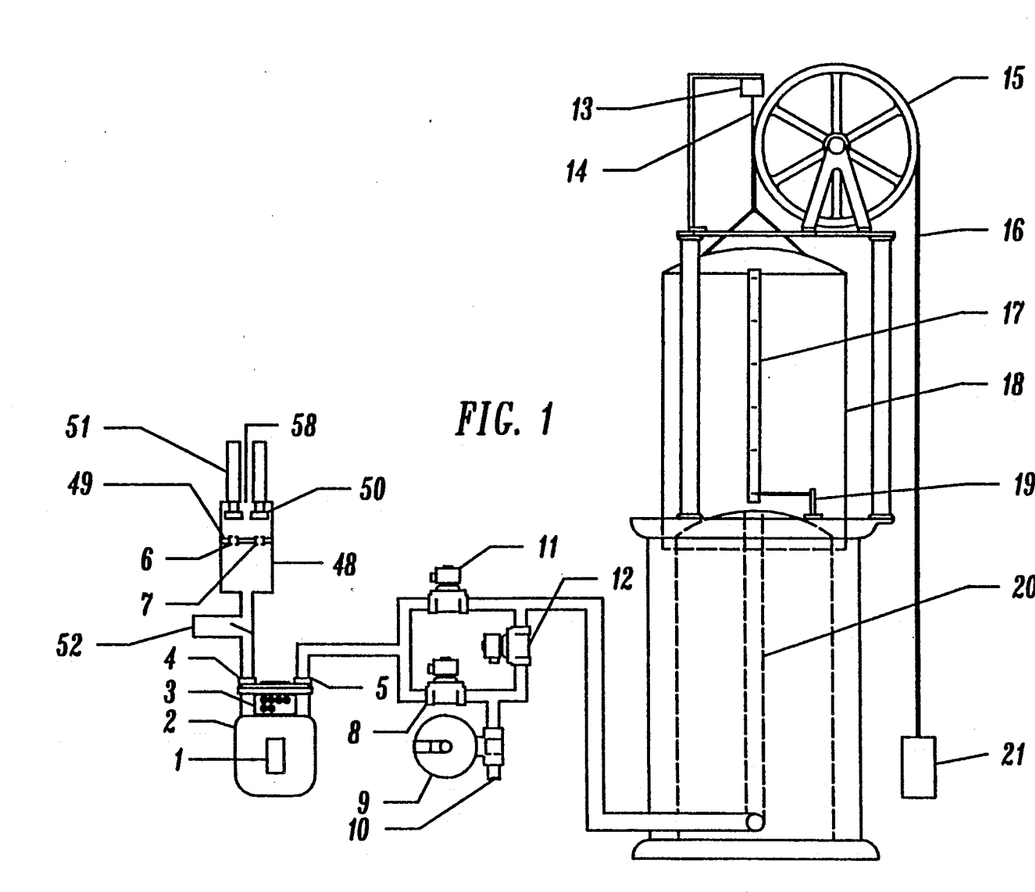
FIG. 1 is a perspective view of the apparatus of the present invention.

The present invention is described with reference to the enclosed figures wherein the same numbers are used where applicable. Referring to FIG. 1, the apparatus of the present invention is shown. The invention incorporates a standard bell prover comprising a bell 18 which is calibrated at equidistant vertical intervals on a bell scale 17. It is to be appreciated by those skilled in the art, that other alternative standards such as a sonic nozzle 18a or master meter 18b may be utilized in the present invention. Visual indication of bell volume is provided by pointer 19. The bell is attached to a counterweight 21 by cable 16 which rides on pulley 15. Initial filling of the bell 18 is accomplished through pipe 20. When air enters the bell 18, the bell rises. Once filled, the test air trapped within the bell is exhausted through pipe 20 into the test meter. Bell 18 has an encoder 13 which is attached to the bell 18 by wire 14. The encoder 13, which can be any one of several designs, transduces the linear motion of bell 18 into an electrical signal which is proportional to the cubic feet of test gas exhausted through pipe 20.

Regulator 9 regulates the supply air 10 which flows through valve 12 and into bell 18. Supply air 10 also passes through regulator 9 and valve 8 then through the test meter 2 and exhausts through orifice 6 and/or 7 and outlet port 58. During testing, outlets 6 and/or 7 are opened.

Figures 2, 2A:
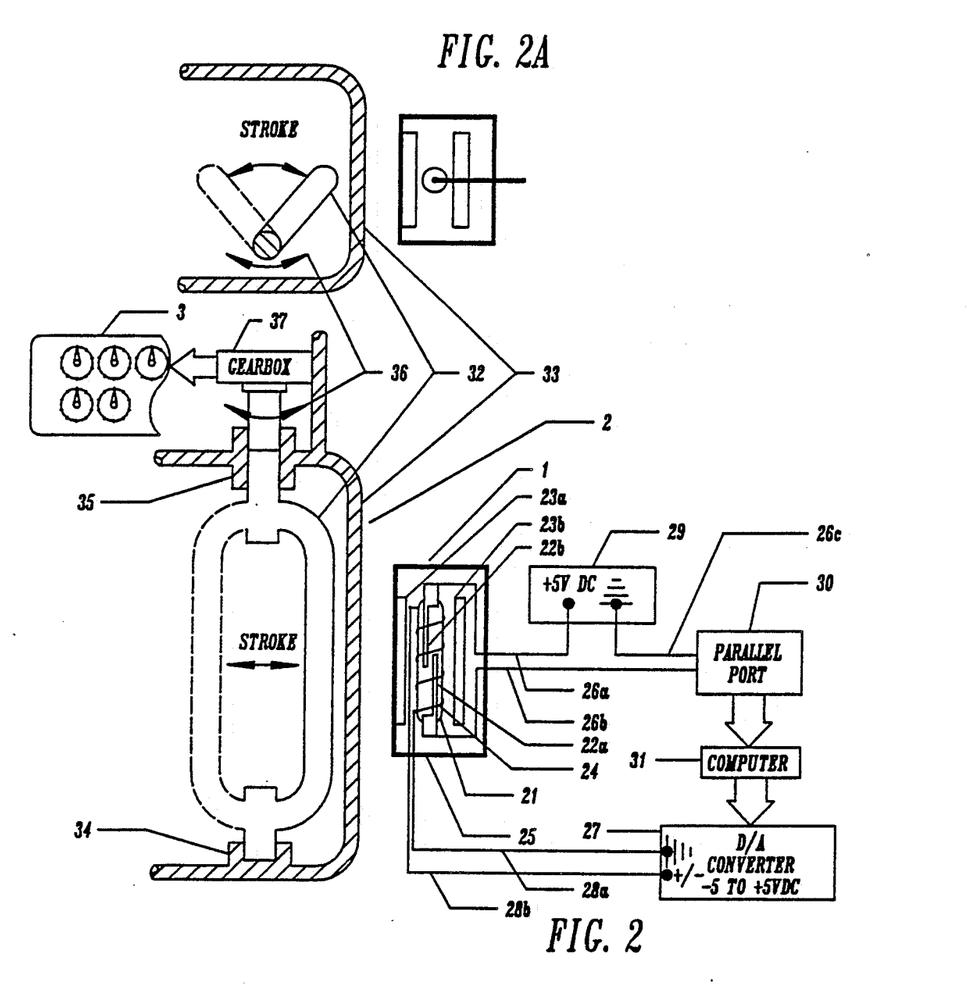
FIG. 2 is a perspective view of the magnetic sensor of the present invention.
FIG. 2A is a plan view of the magnetic sensor of the present invention and oscillating diaphragm arm.
Figure 3:
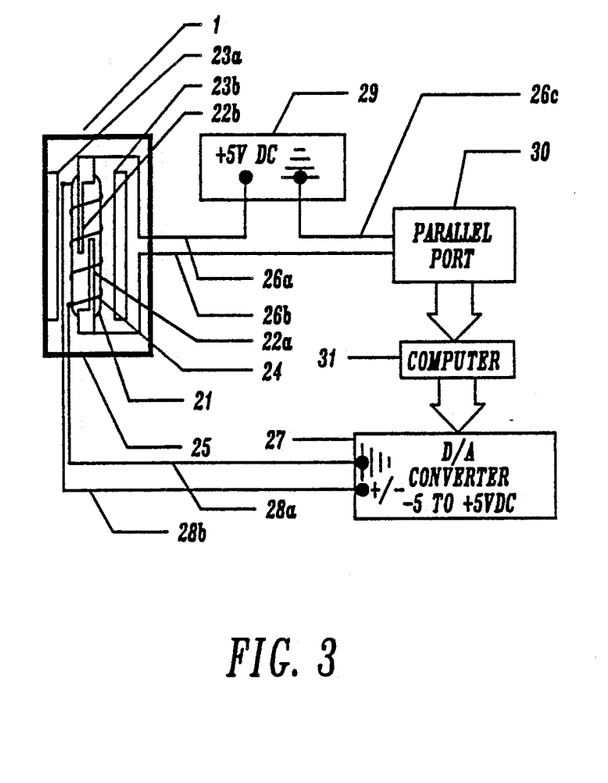
FIG. 3 is a schematic representation of the position sensor of the present invention.

Referring to FIGS. 1, 2 and 3, the magnetic sensor of the preferred embodiment is now described. The magnetic sensor 1 comprises two reeds 22a and 22b of metallic material such as tungsten encapsulated in a glass housing 21 which are mounted equidistant between two magnets 23a and 23b with suitable lead wires 26a and 26b and a coil winding 24 with suitable lead wires 28a and 28b for sensitivity adjustment. These components are potted in epoxy inside a non-ferrous housing 25. Lead wire 26a is connected between reed 22b and the high voltage side of the power supply 29. Lead wire 26c is connected between the low voltage side of the power supply 29 and the low voltage side of the parallel port 30. Lead wire 26b completes the circuit by connecting reed 22a to the high voltage side of the parallel port 30.

As noted above, the sensor includes a structure for sensitivity adjustment. The sensitivity adjusting mechanism comprises coil winding 24 connected by suitable lead wires 28a and 28b to D/A converter 27. The voltage to coil winding 24, supplied by D/A converter 27, is variable from 5 VDC above ground potential to 5 VDC below ground potential. This allows for reversing the magnetic field surrounding the reeds 22a and 22b.

As shown in FIGS. 2 and 2A, during flow conditions, the steel diaphragm connecting arm 32 oscillates towards then away from the meter housing inner wall 33. Each oscillation of diaphragm connecting arm 32 corresponds to a fraction of a cubic foot of gas depending on the meter model. Thus, each of the diaphragm oscillations correspond to the passage through the meter of a fixed quantity of test gas. The diaphragm connecting arm 32 is free to rotate in bearings 34 and 35. The upper bearing 35 also acts as a stuffing box to prevent gas from leaking out of the measuring elements. The oscillations of diaphragm connecting arm 32 are transmitted as rotary motion 36 through bearing 35 where the arm is connected to suitable linkages and gearing 37. The linkages and gearing 37 are in turn connected to the meter index 3 thereby causing the index 3 to advance an amount corresponding to the appropriate number of cubic feet.

In operation, sensor 1 is placed outside of, but in close proximity to the opaque metallic meter housing 33. As the diaphragm connecting arm 32 moves towards the sensor 1, an imbalance in the magnetic field surrounding the reeds 22a and 22b is created. As this imbalance increases, the reeds, which are separated by their own stiffness and the balance magnets, begin to move towards one another. When the imbalance is sufficient reeds 22a and 22b touch. This completes the circuit formed by the reeds 22a and 22b, power supply 29 and the parallel port 30. This condition is sensed as a latch by computer 31 and noted as the test start.

As the flow continues, the diaphragm connecting arm moves away from sensor 1, causing the magnetic field to return to a balanced condition, which in turn causes reeds 22a and 22b to separate. The electronic signal generated by the activation of the sensor corresponds to the passage of a predetermined amount of gas through the meter. For example, tests were completed using the present invention on a domestic diaphragm meter which completed nine revolutions per cubic foot of gas. The computer 31 then awaits the next oscillation. This cycle continues for a preset number of oscillations. The test is then stopped and the number of cubic feet of gas as sensed upon the periodic contact of the reeds is compared to the number of cubic feet of gas indicated by the standard (via encoder 13). As noted above, the encoder 13 tranduces the linear motion of the bell 18 into an electrical signal proportional to the cubic feet of test gas exhausted from bell 18.

While the sensor of preferred embodiment of the present invention has been configured to generate a sensing signal upon the contact of the metallic reeds, it will immediately become apparent to those skilled in the art that the sensor can be configured to generate the sensing signal upon the separation of the reeds. More importantly, it is to be appreciated by those skilled in that art that a plurality of other types of magnetic sensors can be utilized in the present invention.

The sensitivity of the sensor is adjusted in two ways. First, by physically moving the position sensor 1 closer to or further away from the test meter. Second, by incorporating a coil winding 24. By increasing or decreasing the coil voltage above or below ground potential, the force required to close the reeds 22a and 22b can be precisely controlled. If the sensitivity of the position sensor 1 is too high, the reeds 22a and 22b will not open. In such a case, the coil voltage would be increased above ground potential (or decreased below ground potential depending on the orientation of the magnetic field generated by the permanent magnets 23a and 23b) and the voltage is set so that the reeds will close only when rod 32 enters the magnetic field. If the sensitivity of the position sensor 1 is too low, the reeds 22a and 22b will not close. In this case, the voltage is reversed relative to the high sensitivity condition and the voltage is set so that the reeds will close when rod 32 enters the magnetic field. An overall decrease in test time is gained by adjusting the sensitivity during the exercise cycle.

While the meter is exercised, the sensitivity of the position sensor 1 is adjusted until the appropriate cyclical signals are received by parallel port 30. This is accomplished by either increasing or decreasing the sensitivity of position sensor 1. If reeds 22a and 22b remain open and no signal is received from the position sensor 1 within the time that one meter revolution should take place, then the sensitivity is increased until repeating signals are received. Conversely if reeds 22a and 22b remain closed and no signal is received from the position sensor 1 within the time that one meter revolution should take place then the sensitivity is decreased until repeating signals are received. While the present invention has been disclosed and described with reference to a preferred magnetic sensor, it is to be appreciated the present invention could be carried out by other magnetic sensing devices.

Figure 6:
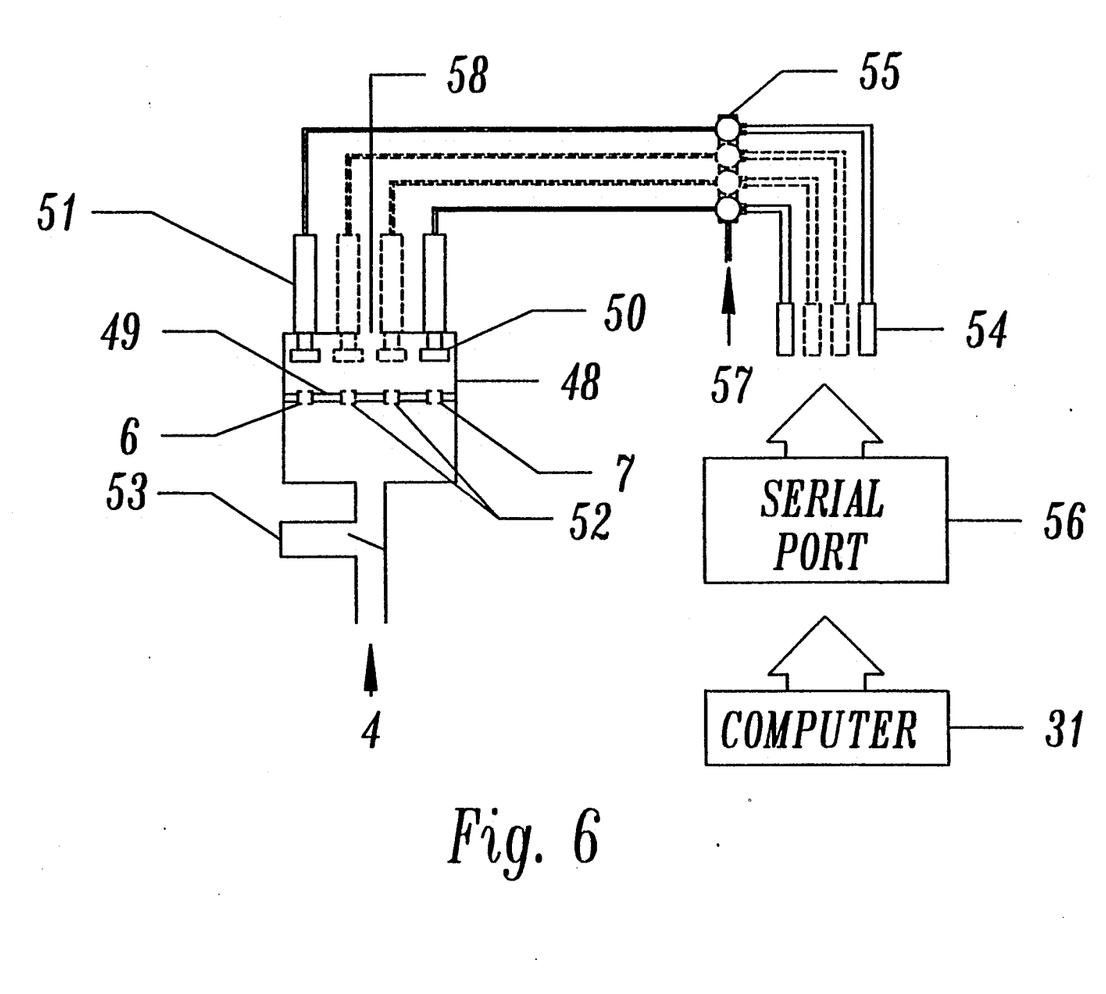
FIG. 6 is a schematic representation of the flow module of the present invention.

The flow module of the present invention is now described with reference to FIG. 6. Flow module 48 greatly increases the utility of the proving system and eliminates the requirement of changing an orifice plate manually for each different meter model. Using flow module 48 described herein, the operator may choose the meter model from a listing presented, for example, on a computer monitor screen. The correct orifice(s) 6, 7 or 52 (52 may represent multiple orifices) are then selected by the computer 31 during each test run. The flow module 48 as shown in FIG. 6 comprises the orifices 6, 7 and 52, an orifice plate 49, into which the orifices 6, 7, and 52 are bored, and a resilient orifice seat disc 50 which is attached to air cylinders 51. Air cylinders 51 are connected to normally closed 3-way solenoids 55 with appropriate hosing and connected electrically to solid state relays 54 with appropriate lead wires. Air is supplied to the solenoids 55 by an air source 57.

In normal operation, air from the meter outlet 4 passes through filter 53, into the flow module 48, and then through orifice(s) 6, 7 or 52 (depending on which is open), and finally then out through the flow module outlet port 58. Prior to starting a meter test all orifices are closed off by a computer signal out the serial port 56 which energizes solenoids 55. This permits high pressure air 57 to activate the cylinders 51 which in turn closes off orifices 6, 7 and 52 with seat discs 50. During the meter test, depending on which test segment is being run, the computer opens one or more orifices (by de-energizing the appropriate solenoid(s) 55) to achieve the desired flow rate.

TYPICAL TEST CYCLE

Figure 4:
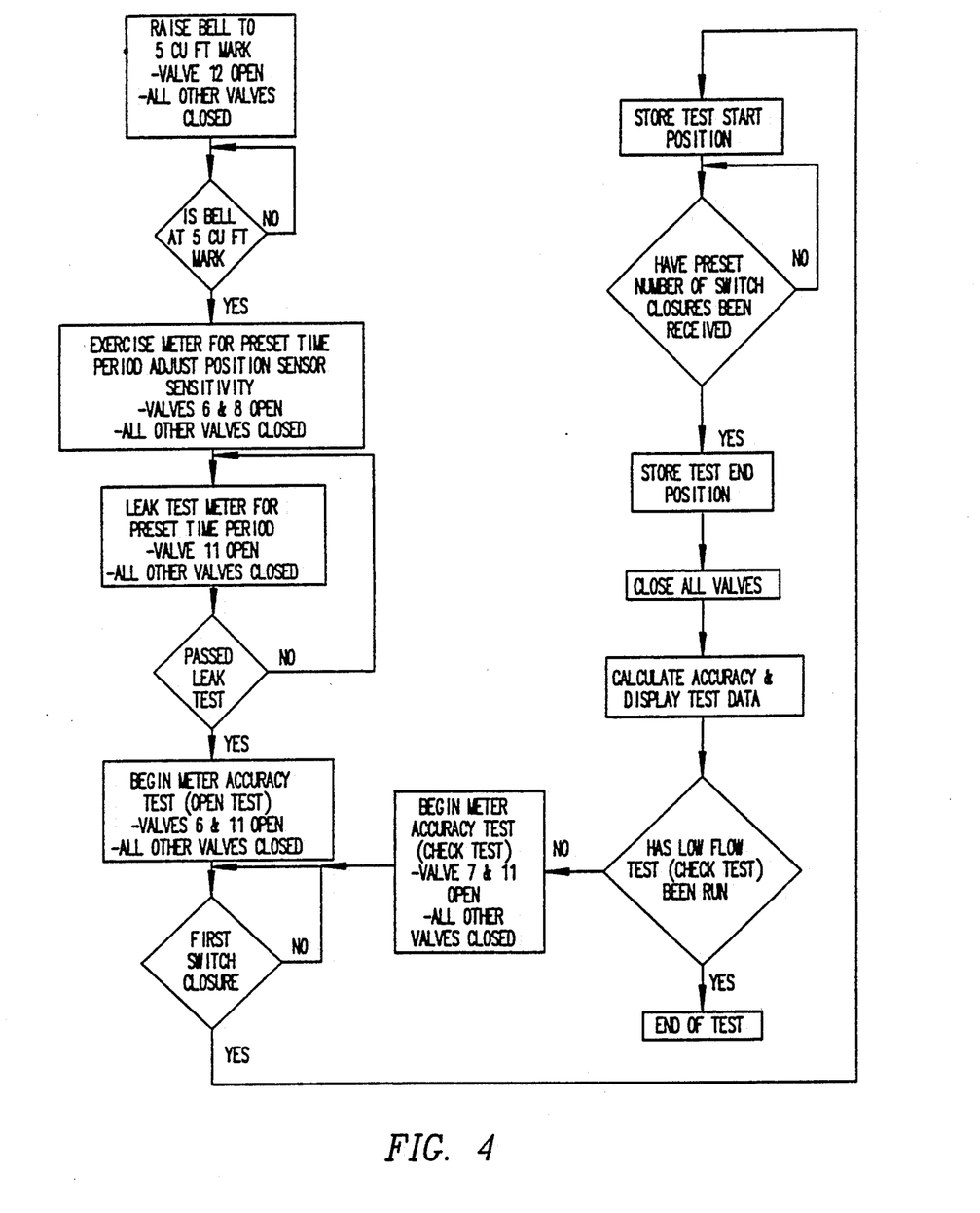
FIG. 4 is an algorithmic representation of the operation of the meter proving method of the present invention.
Figure 5:
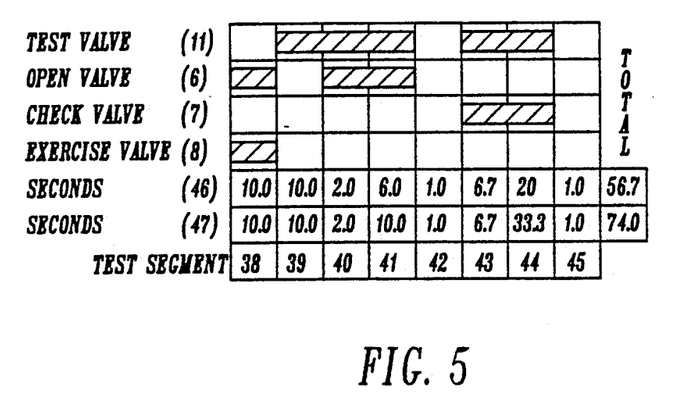
FIG. 5 is a time chart which sets forth position of the valves during the test sequences of the present invention.

The operation of the present invention is now described in the context of an overall testing sequence with reference to FIGS. 1, 2, 5 and the flow chart of FIG. 4. The apparatus of the present invention is shown in FIG. 1. Bell 18 is attached to a counterweight 21 by cable 16 which rides on pulley 15. Initial filling of the bell 18 is accomplished through pipe 20. Once filled, test air trapped within the bell is exhausted through pipe 20 into the test meter. Additionally, the apparatus includes an encoder 13 which is attached to the bell 18 by wire 14.

When the computer 31 initiates a test start, bell 18 is raised by opening valve 12 which allows supply air 10 to flow through regulator 9 and into bell 18 until it reaches the zero cubic foot mark on scale 17 as indicated to the computer 31 via encoder 13. An exercise cycle (test segment 38 FIG. 5) is started by opening orifice 6 and valve 8. Supply air 10 is passed through regulator 9 and valve 8 then through the test meter 2 and exhausts through orifice 6 and outlet port 58. During the exercise cycle the sensitivity of the position sensor 1 is adjusted until the appropriate cyclical signals are received by parallel port 30. This is accomplished by either increasing or decreasing the sensitivity of position sensor 1 as described above. If reeds 22a and 22b remain open and no signal is received from the position sensor 1 within the time that one meter revolution should take place, then the sensitivity is increased until repeating signals are received. Each oscillation of the diaphragm corresponds to the passage through the meter of a fixed or predetermined quantity of test gas. Conversely if reeds 22a and 22b remain closed and no signal is received from the position sensor 1 within the time that one meter revolution should take place then the sensitivity is decreased until repeating signals are received.

After a preset period of time, the exercise cycle ends. Valve 11 is then opened with all other valves remaining closed and a leak test of preset duration begins (segment 39 of FIG. 5). The leak test is measured by the encoder 13. If a leak rate greater than the preset value is indicated by the encoder, the test is aborted. If the leak rate is within limits, the accuracy test at the open rate (high flow) begins by opening only valves 6 and 11 (segment 40). Test air flows from bell 18 through pipe 20 and valve 11 into the test meter 2 via inlet port 5 and exhausting via outlet port 4 and orifice 6. The computer continues to monitor the status of parallel port 30 until a switch closure from sensor 1 is indicated. The computer then stores the test start volume as indicated by the encoder 13 and awaits the next signal. This cycle continues until a preset number of meter tangent cycles (three (3) in the preferred embodiment) have been completed as indicated by the signals from the sensor 1. Each signal generated by the periodic contact of the reeds corresponds to a predetermined amount of gas passing through the meter. After the last signal is received, the computer stores the test end volume as indicated by the encoder 13 (segment 41). All valves are closed and the computer calculates the test meter accuracy based on the relationship between the volume indicated by the encoder and the volume indicated by the periodic contact of the reeds as received at the parallel port. Each contact corresponds to the passage of a fixed quantity of gas (generally a fraction of a cubic foot) depending upon meter model. This result is then corrected for temperature differences between the test gas as it leaves the standard compared with the test gas temperature as it leaves the meter. This and other pertinent test information are then displayed by the computer for operator review (segment 42).

If an optional check test (low flow) is to be run, only valves 11 and 7 are opened and the check test continues as above with segments 43 and 44 comparing to segments 40 and 41 of the open test. When the check test is completed the pertinent test data is displayed along with a menu of choices for the operator depending on whether the test was successful or not (segment 45). If the test was successful the test meter 2 is removed and another meter mounted in its place. If the test meter is outside the accuracy limits the meter is adjusted and retested as above.

The flow module 48 discussed above and shown in FIG. 6 enables the system to be adjusted for testing different meter models. During the meter test, depending on the particular test segment being run, the computer opens one or more orifices (by deenergizing the appropriate solenoid(s) 55) to achieve the desired flow rate.

Actual test results utilizing the system of the present invention are shown at 46 and 47 shown in FIG. 5. The tests were run based upon the following assumptions: (46) a domestic diaphragm meter with a capacity of 250 cubic feet per hour (open rate on natural gas), a check rate of 30% of the open rate, a 9 rev per cubic foot meter and 3 tangent revolutions for each test rate; (47) a domestic diaphragm meter with a capacity of 250 cubic feet per hour (open rate on natural gas), a check rate of 30% of the open rate, a 9 rev per cubic foot meter and 5 tangent revolutions for each test rate.

The present invention has been described with reference to the preferred embodiment. It is to be appreciated by those skilled in the art that other embodiments fall within the spirit and scope of the present invention and that the true nature and scope of the present invention is to be determined with reference to the claims appended hereto.

What is claimed is:

1. A method for determining the periodic oscillation of the diaphragm of a diaphragm gas meter comprising the following steps:
    placing an external magnetic sensor in proximity to the periodically oscillating diaphragm of a gas meter under test, each of said diaphragm oscillations corresponding to the passage through said gas meter of a fixed quantity of test gas, said periodic oscillations of said diaphragm resulting in the activation of said magnetic sensor;
    sensing an electric signal generated by the activation of said sensor, said signal corresponding the movement of said diaphragm in proximity to said external magnetic sensor, said signal further corresponding to an amount of test gas passing through said meter; and
    counting the number of times said magnetic sensor is activated.

2. The method of claim 1 wherein said magnetic sensor comprises at least two metallic reeds encapsulated in a housing, said reeds being retained in a coplaner non-contacting relationship by a magnetic field, said magnetically non-contacting reeds being placed in proximity to the oscillating diaphragm of said gas meter under test, each of said oscillations corresponding to a fixed quantity of gas passing through said meter, said oscillating diaphragm periodically interfering with said magnetic field thereby resulting in the periodic contact of said reeds.

3. The method of claim 1 wherein said electric signal corresponds to a predetermined amount of test gas passing through said meter.

4. A method for testing the accuracy of a diaphragm gas meter comprising the following steps:
    placing an external magnetic sensor in proximity to the oscillating diaphragm of a gas meter under test, each of said diaphragm oscillations corresponding to the passage through said gas meter of a quantity of test gas, said periodic oscillation of the diaphragm resulting in the activation of said magnetic sensor;
    sensing an electrical signal generated by the activation of said sensor, said signal corresponding to a an amount of gas passing through said meter;
    measuring the amount of gas passing through said meter using a standard; and
    comparing the amount of gas measured by the standard with the amount of test gas passing through said meter as sensed by the activation of said sensor in order to determine the accuracy of said meter.

5. The method of claim 4 wherein said magnetic sensor comprises at least two metallic reeds encapsulated in a housing, said reeds being retained in a coplanar non-contacting relationship by a magnetic field, said magnetically non-contacting reeds being placed in proximity to the oscillating diaphragm of said gas meter under test, each of said oscillations corresponding to a fixed quantity of gas passing through said meter, said oscillating diaphragm periodically interfering with said magnetic field thereby resulting in the periodic contact of said reeds;
    an electronic sensing device which activates upon the contact of the metallic reeds.

6. The method of claim 5 wherein said reeds are constructed from tungsten.

7. The method of claim 5 wherein said reeds within said housing are encapsulated in epoxy.

8. The method of claim 5 wherein said housing is constructed from a non-ferrous material.

9. The method of claim 5 wherein said magnetic sensor further comprises means for adjusting the sensitivity of said magnetically non-contacting reeds.

10. Apparatus for proving a test meter comprising:
    means for supplying a test gas to a diaphragm gas meter under test;
    encoder means for determining the amount of test gas supplied from said supplying means;
    valve means for regulating, the flow of gas from said supply means to said diaphragm gas meter under test;

a magnetic sensor placed in proximity to the oscillating diaphragm of said gas meter under test, each of said oscillations corresponding to a fixed quantity of gas passing through said meter, said oscillating diaphragm periodically interfering with said magnetic sensor thereby resulting in the activation of said sensor, each of said activations corresponding to the passage of a fixed quantity of test gas through said meter;

electronic port means which activates upon the activation of said sensor; and processor means for comparing the quantity of gas sensed by said encoder with the quantity of gas sensed by said magnetic sensor.

11. The apparatus of claim 10 wherein said sensor comprises at least two metallic reeds encapsulated in a housing, said reeds being retained in a coplanar non-contacting relationship by a magnetic field, said magnetically non-contacting reeds being placed in proximity to the oscillating diaphragm of said gas meter under test, each of said oscillations corresponding to a fixed quantity of gas passing through said meter, said oscillating diaphragm periodically interfering with said magnetic field thereby resulting in the periodic contact of said reeds.

12. The apparatus of claim 11 wherein said means for supplying a test gas comprises a bell prover.

13. The apparatus of claim 11 wherein said means for supplying a test gas comprises a sonic nozzle.

14. The apparatus of claim 11 wherein said means for supplying a test gas comprises a master meter.

15. A method for testing the accuracy of a diaphragm gas meter comprising the following steps:

retaining a plurality of coplanar metallic reeds in a non-contacting relationship with a magnetic field;

placing said magnetically non-contacting reeds in proximity to the oscillating diaphragm of a gas meter under test, each of said diaphragm oscillations corresponding to the passage through said gas meter of a quantity of test gas, said periodic oscillation of the diaphragm interfering with said magnetic field, thereby resulting in the contact of the reeds;

sensing an electrical signal generated by the contact of said reeds, said signal corresponding to an amount of gas passing through said meter;

measuring the amount of gas passing through said meter using a standard; and comparing the amount of gas measured by the standard with the amount of gas passing through said test meter as sensed upon the contact of said reeds in order to determine the accuracy of said meter.

* * * * *